United States Patent
Celik

(10) Patent No.: US 7,577,841 B2
(45) Date of Patent: Aug. 18, 2009

(54) WATERMARK PLACEMENT IN WATERMARKING OF TIME VARYING MEDIA SIGNALS

(75) Inventor: Mehmet U. Celik, Rochester, NY (US)

(73) Assignee: Digimarc Corporation, Beaverton, OR (US)

( * ) Notice: Subject to any disclaimer, the term of this patent is extended or adjusted under 35 U.S.C. 154(b) by 1143 days.

(21) Appl. No.: 10/300,921

(22) Filed: Nov. 19, 2002

(65) Prior Publication Data

US 2004/0034778 A1 Feb. 19, 2004

Related U.S. Application Data

(60) Provisional application No. 60/404,038, filed on Aug. 15, 2002.

(51) Int. Cl.
*H04L 9/00* (2006.01)
(52) U.S. Cl. .......... 713/176; 283/113; 283/72; 726/29; 725/20; 725/22; 358/3.28; 382/240; 382/100
(58) Field of Classification Search .......... 713/176; 283/113, 72; 726/29; 725/20, 22; 358/3.28
See application file for complete search history.

(56) References Cited

U.S. PATENT DOCUMENTS

| | | |
|---|---|---|
| 4,939,515 A | 7/1990 | Adelson |
| 4,969,041 A | 11/1990 | O'Grady et al. |
| 5,319,735 A | 6/1994 | Preuss et al. |
| 5,337,361 A | 8/1994 | Wang et al. |
| 5,530,751 A | 6/1996 | Morris |
| 5,530,759 A | 6/1996 | Braudaway et al. |
| 5,613,004 A | 3/1997 | Cooperman et al. |
| 5,636,292 A | 6/1997 | Rhoads |
| 5,646,997 A | 7/1997 | Barton |
| 5,652,626 A | 7/1997 | Kawakami et al. |
| 5,659,726 A | 8/1997 | Sandford, II et al. |
| 5,663,766 A | 9/1997 | Sizer |
| 5,664,018 A | 9/1997 | Leighton |
| 5,668,898 A | 9/1997 | Tatsuta |
| 5,687,191 A | 11/1997 | Lee et al. |

(Continued)

FOREIGN PATENT DOCUMENTS

DE   29 43 436   5/1981

(Continued)

OTHER PUBLICATIONS

G. Voyatzis and I. Pitas "Chaotic Watermarks for Embedding in the Spatial Digital Image Domain" 1998, pp. 432-433, and 436.*

(Continued)

*Primary Examiner*—Nasser G Moazzami
*Assistant Examiner*—Eleni A Shiferaw

(57) ABSTRACT

A method of placing a watermark in a video stream estimates motion between frames in the video stream, and computes a representative motion for a frame. Before embedding the watermark in that frame, the method spatially adjusts a digital watermark by the representative motion. This method is particularly suited for embedding a watermark in a video stream compressed using motion estimation. In this case, the method uses the motion vectors in the video stream to compute a dominant motion for a frame, and then shifts the watermark by this dominant motion before embedding it in the frame.

15 Claims, 2 Drawing Sheets

U.S. PATENT DOCUMENTS

| | | | |
|---|---|---|---|
| 5,687,236 A | 11/1997 | Moskowitz et al. | |
| 5,710,834 A | 1/1998 | Rhoads | |
| 5,721,788 A | 2/1998 | Powell | |
| 5,727,092 A | 3/1998 | Sandford et al. | |
| 5,745,604 A | 4/1998 | Rhoads | |
| 5,748,783 A | 5/1998 | Rhoads | |
| 5,768,426 A | 6/1998 | Rhoads | |
| 5,778,102 A | 7/1998 | Sandford et al. | |
| 5,799,092 A | 8/1998 | Kristol et al. | |
| 5,809,139 A | 9/1998 | Girod et al. | |
| 5,832,119 A | 11/1998 | Rhoads | |
| 5,835,639 A | 11/1998 | Honsinger et al. | |
| 5,841,886 A | 11/1998 | Rhoads | |
| 5,848,155 A | 12/1998 | Cox et al. | |
| 5,857,038 A | 1/1999 | Owada et al. | |
| 5,859,920 A | 1/1999 | Daly et al. | |
| 5,862,260 A | 1/1999 | Rhoads | |
| 5,901,178 A | 5/1999 | Lee et al. | |
| 5,903,892 A | 5/1999 | Hoffert | |
| 5,905,819 A | 5/1999 | Daly | |
| 5,915,027 A | 6/1999 | Cox et al. | |
| 5,915,044 A | 6/1999 | Gardos et al. | |
| 5,930,369 A | 7/1999 | Cox | |
| 5,930,377 A | 7/1999 | Powell et al. | |
| 5,933,798 A | 8/1999 | Linnartz | |
| 5,946,414 A | 8/1999 | Cass et al. | |
| 5,949,055 A | 9/1999 | Fleet et al. | |
| 5,949,885 A | 9/1999 | Leighton | |
| 5,956,716 A | 9/1999 | Kenner | |
| 5,960,081 A | 9/1999 | Vynne | |
| 5,983,176 A | 11/1999 | Hoffert | |
| 5,987,459 A | 11/1999 | Swanson | |
| 6,005,643 A | 12/1999 | Morimoto et al. | |
| 6,018,593 A | 1/2000 | Yamagata | |
| 6,026,193 A | 2/2000 | Rhoads | |
| 6,031,914 A | 2/2000 | Tewfik et al. | |
| 6,037,984 A | 3/2000 | Isnardi | |
| 6,061,451 A | 5/2000 | Muratani | |
| 6,061,793 A | 5/2000 | Tewfik | |
| 6,069,914 A | 5/2000 | Cox | |
| 6,094,722 A | 7/2000 | Astola | |
| 6,104,826 A | 8/2000 | Nakagawa | |
| 6,108,434 A | 8/2000 | Cox | |
| 6,122,403 A | 9/2000 | Rhoads | |
| 6,181,813 B1 | 1/2001 | Fan | |
| 6,208,745 B1 | 3/2001 | Florencio et al. | |
| 6,211,919 B1 | 4/2001 | Zink et al. | |
| 6,226,387 B1 | 5/2001 | Tewfik et al. | |
| 6,229,924 B1 | 5/2001 | Rhoads et al. | |
| 6,266,419 B1 | 7/2001 | Lacy et al. | |
| 6,266,430 B1 | 7/2001 | Rhoads | |
| 6,282,299 B1 | 8/2001 | Tewfik et al. | |
| 6,285,776 B1 | 9/2001 | Rhoads | |
| 6,314,192 B1 | 11/2001 | Chen | |
| 6,332,030 B1 | 12/2001 | Manjunath et al. | |
| 6,334,187 B1 | 12/2001 | Kadono | |
| 6,343,138 B1 | 1/2002 | Rhoads | |
| 6,345,104 B1 | 2/2002 | Rhoads | |
| 6,359,985 B1 | 3/2002 | Koch et al. | |
| 6,373,965 B1 | 4/2002 | Liang | |
| 6,385,329 B1 | 5/2002 | Sharma et al. | |
| 6,385,330 B1 | 5/2002 | Powell et al. | |
| 6,404,926 B1* | 6/2002 | Miyahara et al. | 382/232 |
| 6,408,082 B1 | 6/2002 | Rhoads et al. | |
| 6,411,392 B1 | 6/2002 | Bender et al. | |
| 6,411,725 B1 | 6/2002 | Rhoads | |
| 6,424,725 B1 | 7/2002 | Rhoads et al. | |
| 6,424,726 B2 | 7/2002 | Nakano et al. | |
| 6,449,379 B1 | 9/2002 | Rhoads | |
| 6,483,927 B2 | 11/2002 | Brunk et al. | |
| 6,522,771 B2 | 2/2003 | Rhoads | |
| 6,563,936 B2 | 5/2003 | Brill et al. | |
| 6,567,533 B1 | 5/2003 | Rhoads | |
| 6,580,808 B2 | 6/2003 | Rhoads | |
| 6,580,819 B1 | 6/2003 | Rhoads | |
| 6,597,738 B1* | 7/2003 | Park et al. | 375/240.16 |
| 6,608,919 B1 | 8/2003 | Alattar | |
| 6,614,914 B1 | 9/2003 | Rhoads et al. | |
| 6,625,297 B1 | 9/2003 | Bradley | |
| 6,647,128 B1 | 11/2003 | Rhoads | |
| 6,674,876 B1* | 1/2004 | Hannigan et al. | 382/100 |
| 6,707,930 B2* | 3/2004 | Kalker et al. | 382/100 |
| 6,711,276 B1* | 3/2004 | Yoshiura et al. | 382/100 |
| 6,754,377 B2 | 6/2004 | Rhoads | |
| 6,771,795 B1* | 8/2004 | Isnardi | 382/100 |
| 6,798,894 B2 | 9/2004 | Rhoads | |
| 6,823,075 B2* | 11/2004 | Perry | 382/100 |
| 6,959,098 B1 | 10/2005 | Alattar | |
| 6,961,444 B2* | 11/2005 | Levy | 382/100 |
| 6,973,197 B2 | 12/2005 | Miller | |
| 6,975,744 B2 | 12/2005 | Sharma et al. | |
| 6,993,153 B2 | 1/2006 | Bradley | |
| 6,999,598 B2* | 2/2006 | Foote et al. | 382/100 |
| 7,020,304 B2 | 3/2006 | Alattar et al. | |
| 7,058,979 B1* | 6/2006 | Baudry et al. | 726/32 |
| 7,130,443 B1* | 10/2006 | Werner et al. | 382/100 |
| 7,197,164 B2 | 3/2007 | Levy | |
| 2001/0019611 A1 | 9/2001 | Hilton | |
| 2001/0053237 A1 | 12/2001 | Hashimoto et al. | |
| 2002/0076083 A1* | 6/2002 | Levy | 382/100 |
| 2002/0087864 A1* | 7/2002 | Depovere et al. | 713/176 |
| 2002/0108043 A1* | 8/2002 | Tanaka | 713/176 |
| 2002/0164046 A1 | 11/2002 | Walker et al. | |
| 2002/0172394 A1 | 11/2002 | Venkatesan et al. | |
| 2002/0172395 A1* | 11/2002 | Foote et al. | 382/100 |
| 2002/0191810 A1* | 12/2002 | Fudge et al. | 382/100 |
| 2003/0021439 A1* | 1/2003 | Lubin et al. | 382/100 |
| 2003/0059082 A1* | 3/2003 | Suzuki et al. | 382/100 |
| 2003/0123659 A1* | 7/2003 | Forstrom et al. | 380/205 |
| 2003/0185417 A1* | 10/2003 | Alattar et al. | 382/100 |
| 2004/0049680 A1* | 3/2004 | Lee et al. | 713/176 |
| 2004/0125952 A1 | 7/2004 | Alattar et al. | |
| 2006/0120559 A1* | 6/2006 | Levy | 382/100 |

FOREIGN PATENT DOCUMENTS

| | | |
|---|---|---|
| EP | 0824821 | 2/1998 |
| EP | 1217840 | 6/2002 |
| JP | 3-185585 | 8/1991 |
| WO | WO9828510 | 6/1998 |
| WO | WO02060182 | 8/2003 |

OTHER PUBLICATIONS

Barni et al., "Object watermarking for MPEG-4 video streams copyright protyection," *Proc. SPIE vol. 3971: Security and Watermarking of Multimedia Contents II*, Jan. 2000, pp. 465-476.

Deguillaume et al., "Robust 3D DFT Video Watermarking," *Proc. SPIE vol. 3657: Security and Watermarking of Multimedia Contents*, Jan. 1999, pp. 113-124.

Echizen et al., "General Quality Maintenance Module for Motion Picture Watermarking," *IEEE Trans. on Consumer Electronics*, vol. 45, No. 4, Nov. 1999, pp. 1150-1158.

Kim et al., "An Object-based Video Watermarking," *Proc. Int. Conf. on Consumer Electronics*, Jun. 1999, pp. 100-101.

Lee et al., "Adaptive Video Watermarking Using Motion Information," *Proc. SPIE vol. 3971: Security and Watermarking of Multimedia Contents II*, Jan. 2000, pp. 209-216.

Suthaharan et al. "Perceptually Tuned Video Watermarking Scheme using Motion Entropy Masking," *Proc. IEEE Region 10 Conf.*, Sep. 1999, pp. 182-185.

Swanson et al., "Object-Based Transparent Video Watermarking," *Proc. IEEE First Workshop on Multimedia Signal Processing*, Jun. 1997, pp. 369-374.

Swanson et al., "Multiresolution Scene-Based Video Watermarking Using Perceptual Models," *IEEE Journal on Selected Areas in Communications*, vol. 16, No. 4, May 1998, pp. 540-550.

Szepanski, "Compatibility Problems in Add-On Data Transmission for TV-Channels," 2d Symp. and Tech. Exh. On Electromagnetic Compatibility, Jun. 28, 1977, pp. 263-268.

Szepanski, "Binary Data Transmission Over Video Channels with Very Low Amplitude Data Signals," Fernseh- und Kino-Technik, vol. 32, No. 7, Jul. 1978, pp. 251-256 (German text with full English translation).

Szepanski, Additive Binary Data Transmission for Video Signals, Conference of the Communications Engineering Society, 1980, NTG Technical Reports, vol. 74, pp. 343-351 (German text with full English translation).

U.S. Appl. No. 60/308,718, Lubin et al., filed Jul. 30, 2001.

U.S. Appl. No. 11/265,766, filed Nov. 1, 2005.

WordPackage 8: Watermarking, pp. 1-46, Jun. 1995. cited by examiner. "Access Control and COpyright Protection for Images, WorkPackage 8: Watermarking," Jun. 30, 1995, 46 pages.

Arena et al., "Digital watermarking applied to MPEG-2 coded video sequences exploiting space and frequency masking," *Proceedings of the IEEE Internal Conference on Image Processing '00*, Vancouver, Canada, 2000.

Bas et al., "A new video-object watermarking scheme robust to object manipulation," *Proceedings of the IEEE International Conference on Image Processing '01*, Thessaloniki, Greece, 2001, pp. 526-529.

Basso, et al., "Study of MPEG-2 coding performance based on a perceptual quality metric," *Proceedings of the 1996 Picture Coding Symposium*, Australia, Mar. 1996, pp. 263-268.

Bender, "Techniques for Data Hiding," SPIE vol. 2420, pp. 164-173, 1995.

Bors et al., "Image Watermarking Using DCT Domain Constraints," Poc. IEEE Int. Conf. on Image Processing, vol. 3, Sep., 1996, pp. 231-234.

Brassil et al., "Electronic Marking and Identification Techniques to Discourage Document Copying", Proceedings of INFOCOM '94 Conference on Computer, IEEE Commun. Soc Conference, Jun. 12-16, 1994, pp. 1278-1287.

Burgett et al., "A Novel Method for Copyright Labeling Digitized Image Data," Sep. 1994, 12 pages.

Cox et al., "Secure spread spectrum watermarking for multimedia," *IEEE Transactions on Image Processing*, vol. 6, No. 12, pp. 1673-1687, Dec. 1997.

Dittmann, Jana et al., "Robust MPEG Video Watermarking Technologies", ACM Multimedia '98, Bristol, UK, 1998, pp. 71-80.

Hartung et al., Digital Watermarking of Raw and Compressed Video, Proc. SPIE 2952, Digital Compression Technologies and Systems for Video Communications, Oct. 1996, pp. 205-213.

Hartung et al., "Multimedia watermarking techniques," *Proceedings of the IEEE*, vol. 87, No. 7, pp. 1079-1107, Jul. 1999.

Hartung, et al., "Watermarking of uncompressed and compressed video, " *Signal Processing*, vol. 66, No. 3, pp. 283-301, May 1998.

Herrigel et al., "The watermark template attack," *Proceedings of the SPIE Security and Watermarking of Multimedia Contents III*, Wong, Delp, Editors, vol. 4314;, San Jose, California, Jan. 22-25, 2001, pp. 394-405.

Highwater FBI, "Copyright Protection for Digital Images, Digital Fingerprinting from FBI," Brochure, 4 pgs. 1995.

Holliman et al., "Adaptive Public Watermarking of DCT-Based Compressed Images," SPIE vol. 3312, Dec. 1997, pp. 284-295.

JPEG Group's JPEG Software (release 4), FTP.CSUA,Berekeley. EDU/PUB/Cypherpunks/Applications/JSTEG/JPEG. Announcement.GZ, Jun. 1993, 2 pages.

Kalker et al., "A video watermarking system for broadcast monitoring," *Proceedings of the SPIE Security and Watermarking of Multimedia Contents*, vol. 3657, Jan. 25-27, 1999, San Jose, California, pp. 103-112.

Kawaguchi et al., "Principle and Applications of BPCS-Steganography," Proc. SPIE vol. 3528: Multimedia Systems and Applications, Nov. 2-4, 1998, pp. 464-473.

Koch et al., "Copyright Protection for Multimedia Data," Proc. Of the Int. Conf. On Digital Media and Electronic Publishing, Leeds, U.K., Dec., 1994, 15 pages.

Komatsu et al., "A Proposal on Digital Watermark in Document Image Communication and Its Application to Realizing a Signature," Electronics and Communications in Japan, Part 1, vol. 73, No. 5, 1990, pp. 22-33.

Komatsu et al., "Authentication System Using Concealed Image in Telematics," Memoirs of the School of Science & Engineering, Waseda Univ., No. 52, 1988, pp. 45-60.

Langelaar et al., "Watermarking digital image and video data: A state-of-the-art overview," *IEEE SIgnal Processing Magazine*, vol. 17, No. 5, pp. 20-46, Sep. 2000.

Langelaar et al., "Robust Labeling Methods for Copy Protection of Images," Proc. SPIE Electronic Imaging '97: Storage and Retrieval of Image and Video Databases V, Feb. 1997, pp. 298-309.

Langelaar et al., "Copy Protection for Multimedia Data based on Labeling Techniques," Jun. 1996, 9 pages.

Langelaar et al., "Watermarking by DCT Coefficient Removal: A Statistical Approach to Optimal Parameter Settings," SPIE vol. 3657, Jan. 1999, pp. 2-13.

Langelaar et al., "Optimal differential energy watermarking of DCT encoded images and video," *IEEE Transactions on Image Processing*, vol. 10, No. 1, pp. 148-158, Jan. 2001.

Lin et al., "Streaming video and rate scalable compression: What are the challenges for watermarking?",*Proceedings of the SPIE Security and Watermarking of Multimedia Contents III*, Wong, Delp, Editors, vol. 4314, Jan. 22-25, 2001, San Jose, California, pp. 116-127.

Lin et al., "Temporal synchronization in video watermarking," *Proceedings of the SPIE Security and Watermarking of Multimedia Contents IV*, Wong, Delp, Editors, vol. 4675, Jan. 21-24, 2002, San Jose, California, pp. 478-490.

Lin, et al., "Rotation, scale, and translation resilient watermarking for images," *IEEE Transactions on Image Processing*, vol. 10, No. 5, pp. 767-782, May 2001.

Matsui et al., "Video-Steganography: How to Secretly Embed a Signature in a Picture," IMA Intellectual Property Project Proceedings, Jan. 1994, vol. 1, Issue 1, pp. 187-205.

Mora-Jimenez et al., "A new spread spectrum watermarking method with self-synchronization capabilities," *Proceedings of the IEEE International Conference on Image Processing '00*, Vancouver, Canada, Sep. 10-13, 2000.

Nicholson et al., "Watermarking in the MPEG4 context," *European Conference on Multimedia Applications Services and Techniques*, Madrid, Spain, May 1999, pp. 472-492.

Ogihara et al, "Data Embedding into Pictorial Images with Less Distortion Using Discrete Cosine Transform," Proceedings of ICPR 96, IEEE, pp. 675-679.

O'Ruanaidh, "Rotation, Scale and Translation Invariant Digital Image Watermarking," Signal Processing, pp. 2-15, May 1, 1998.

O'Ruanaidh, "Rotation, Scale and Translation Invariant Digital Image Watermarking," 1997 IEEE, pp. 536-539.

J. 'O Ruanaidh and G. Csurka, "A bayesian approach to spread spectrum watermark detection and secure copyright protection for digital image libraries", *Proceedings of the IEEE Conference on Computer Vision and Pattern Recognition*, Fort Collins, Colorado, USA, Jun. 1999.

Pereira et al., "Template based recovery of Fourier-based watermarks using log-polar and log-log maps," *Proceedings of the IEEE International Conference on Multimedia Computing and Systems*, vol. 1, 1999, pp. 870-874.

Piva et al., "A DWT-Based Object Watermarking System for MPEG-4 Video Streams," *Proceedings of the IEEE International Conference on Image Processing '00*, Vancouver, Canada, 2000, pp. 5-8.

Sheng, "Experiments on Pattern Recognition Using Invariant Fourier-Mellin Descriptors," Journal of Optical Society of America, vol. 3, No. 6, pp. 771-776, 1986.

Sullivan et al., "Rate-distortion optimization for video compression," *IEEE Signal Processing Magazine*, vol. 15, No. 6, Nov. 1998, pp. 74-90.

Swanson et al., "Multimedia data-embedding and watermarking technologies," *Proceedings of the IEEE*, vol. 86, No. 6, pp. 1064-1087, Jun. 1998.

Szepanski, "A Signal theoretic method For Creating Forgery-Proof Documents For Automatic Verification", 1979 Carnahan Conference on Crime Countermeasures, University of Kentucky, Lexington, Kentucky, May 16-18, 1979.

Tanaka, "Embedding the attribute Information Into a Dithered Image," Systems and Computers in Japan, vol. 21, No. 7, 1990, pp. 43-50.

Tanaka et al., Embedding Secret Information Into a Dithered Multi-Level Image, 1990 IEEE, pp. 216-220.

van den Branden Lambrecht et al., "Perceptual quality measure using a spatio-temporal model of the human visual system," *Proceedings of the SPIE Digital Video Compression: algorithms and Technologies 1996*, vol. 2668, San Jose, California, Jan. 28-Feb. 2, 1996, pp. 450-461.

van Schyndel et al., "A Digital Watermark," IEEE International Conference on Image Processing, Nov. 13, 1994 pp. 86-90.

Weighted PSNR for images as in Certimark: S. Voloshynovskiy, S. Pereira, V. Iquise and T. Pun, "Attack modeling: Towards a second generation benchmark," *Signal Processing, Special Issue: Information Theoretic Issues in Digital Watermarking*, May, 2001. V. Cappellini, M. Basrni, F. Bartolini, Eds.

Wang et al., "A universal image quality index," *IEEE Signal Processing Letters*, vol. 9, Nol. 3, Mar. 2002.

Watson et al., "Digital video quality metric based on human vision," *Journal of Electronic Imaging*, vol. 10, No. 1, pp. 20-29, 2001.

Webster et al., "An objective video quality assessment system based on human perception," *Proceedings of the Human Vision, Visual Processing, and Digital Displays IV*, Feb. 1993, San Jose, CA, pp. 15-26.

Western et al., "Spatio-temporal model of human vision for digital video compression," *Proceedings of the SPIE Human Vision and Electronic Imaging II*, Rogowitz, Pappas, Editors, vol. 3016, San Jose, CA, 1997, pp. 260-268.

Notice of Allowance dated Dec. 9. 2008, from U.S. Appl. No. 10/636,505.

* cited by examiner

US 7,577,841 B2

WATERMARK PLACEMENT IN WATERMARKING OF TIME VARYING MEDIA SIGNALS

RELATED APPLICATION DATA

This application claims priority from U.S. Provisional Application No. 60/404,038 filed Aug. 15, 2002, which is hereby incorporated by reference.

TECHNICAL FIELD

The invention relates to digital watermarking.

BACKGROUND AND SUMMARY

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by subtly altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's co-pending application Ser. No. 09/503,881 and U.S. Pat. No. 6,122,403, which are hereby incorporated by reference.

These watermarking techniques can be applied to embed auxiliary data in the compressed domain of multimedia signals. One challenge, however, is that some compression methods use a technique called "motion compensation" that may interfere with the watermark signal or create artifacts in the host signal in which the watermark is embedded. Motion compensation refers to a process often used in compression where a signal from a particular frame is predicted from one or more other frames. This technique enhances compression efficiency because the compressed version need only include a "key" frame (called the I frame), and predicted frames, coded as the difference between the frame and a predicted version of that frame.

"Drift compensation" refers to a method that prevents accumulation of visual distortions due to additive watermarking in compression schemes with motion compensation. Unless compensated properly, watermark error propagates both temporally and spatially as a result of motion compensation. Propagation of watermark signal to the consecutive frames has two potential disadvantages: it degrades the visual quality, and may interfere (most probably deconstructive interference) with the consecutive watermark signals reducing detection performance.

The invention provides a method for enhancing watermark embedding in time varying signals. One particular implementation applies to digital watermarking of compressed video stream in the MPEG compression format. However, the invention is not limited to a particular compression format. For example, the method may be applied to watermark embedding of video in the spatial domain and uncompressed video.

One aspect of the invention is a method of placing a watermark in a video stream. The method estimates motion between frames in the video stream, and computes a representative motion for a frame. Finally, the method spatially adjusts a digital watermark by the representative motion before embedding it in the frame. This method is particularly suited for embedding a watermark in a video stream compressed using motion estimation. The method can use the motion data in the video stream to compute a dominant motion for a frame, and then shift the watermark by this dominant motion before embedding it in the frame.

Further features will become apparent with reference to the following detailed description and accompanying drawings.

DETAILED DESCRIPTION

Figure 1:
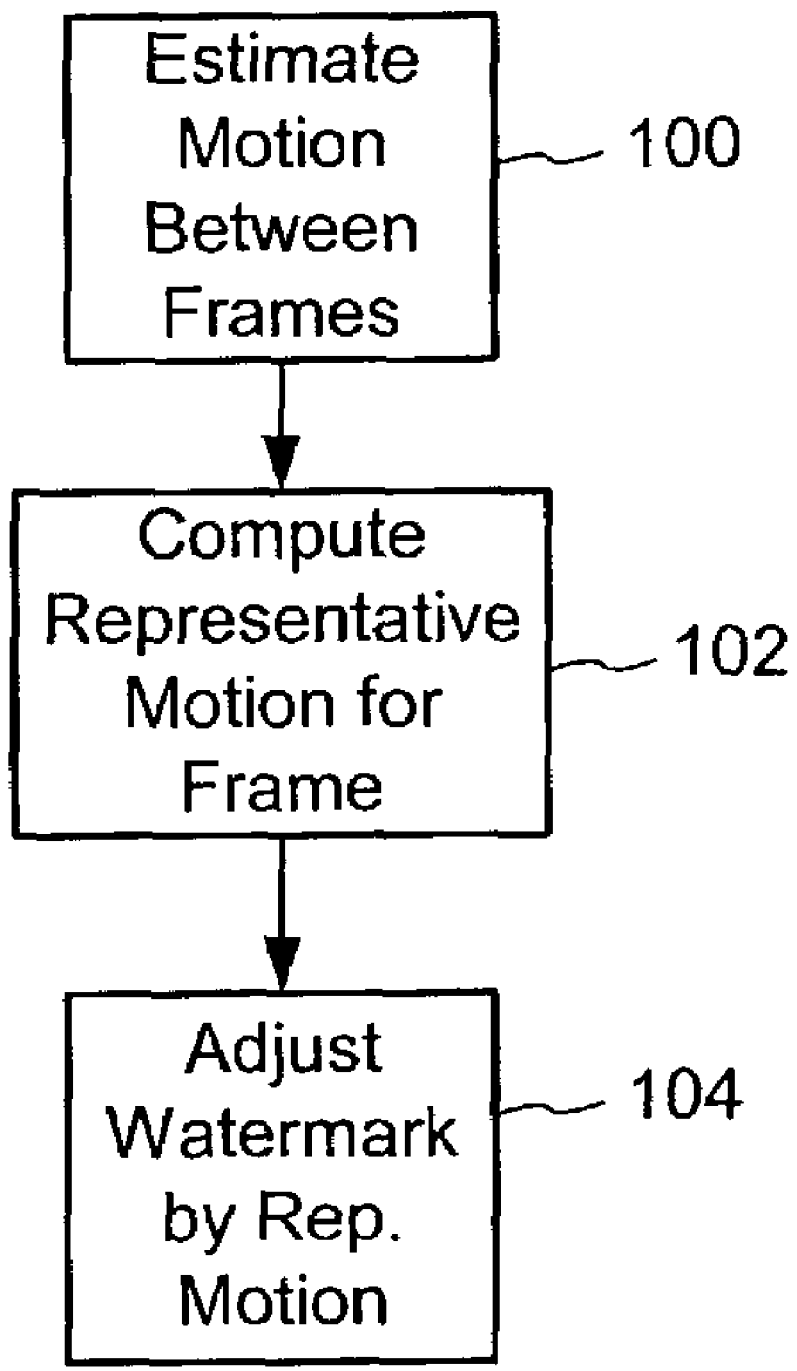
FIG. 1 is a flow diagram illustrating an overview of method of placing a watermark in a time varying signal.

This section describes a method for placing a watermark in compressed video. The following assumptions are made as a context for this method:

1. Though the method is generally applicable to other compression formats, this example focuses on an MPEG video sequence with Group of Picture (GOP) structure comprising frames I . . . P . . . P . . . P . . . P . . . . At this moment, we assume that B-VOP's are skipped during watermarking if and when they exist in the GOP structure.

2. Watermark detection is done per frame basis and the detection algorithm is robust or invariant to spatial shifts. (Many watermarking algorithms fit in this description.) Again this is not intended to be a limitation on the watermark placement method.

3. In the spatial domain, the watermark signal has white noise characteristics. In particular, spatial shifts of the watermark signal are uncorrelated. This assumption can be relaxed and a limited correlation may be allowed.

4. In temporal the direction, the watermark signal or at least a part of the signal remains constant. For instance, the same watermark signal is embedded in all frames, or a component of the watermark, e.g. a template for synchronization, remains constant throughout the frames. This assumption is applied for a GOP. An all-different watermark may be used in different GOPs in the video stream.

5. During modification of the video samples (e.g., DCT-coefficients in the compressed stream) to superimpose the watermark, the resulting change in the bit-rate of the compressed video signal is proportional to the energy of the additive signal, e.g., watermark. Equivalently, under a fixed, or limited, bit-rate constraint, the energy of the additive signal is constant. Again, this is not intended as a limitation on the general method, yet applies to the example implementation described in this section.

In general, a watermarking process with drift compensation may be represented by the following equations. Superscript denotes the frame number. The letter I refers to an intra-coded Video Object Plane (VOP), and P refers to an inter-coded VOP with forward prediction.

$$I^k_w = I^k + W^k$$

$$P^{k+1}_w = P^{k+1} + W^{k+1} - D^k,$$

Where $D^k$ is the drift compensation component, which is a motion compensated version of the cumulative error induced on the previous frame, i.e. the difference between decoded original and watermarked frames.

After drift compensation, each watermarked and reconstructed frame will only differ from the original reconstructed frame by the watermark amount.

$$R^k = I^k$$

$$R^{k+1} = R^k_{MC} + P^{k+1} = I^k_{MC} + P^{k+1}$$

$$R^k = I^k + W^k$$

$$R^{k+1} = R^k_{MC} + P^{k+1} + W^{k+1} - D^k$$

$$= I^k_{MC} + W^k_{MC} + P^{k+1} + W^{k+1} - W^k_{MC}$$

$$= I^k_{MC} + P^{k+1} + W^{k+1}$$

Note that, for each P-VOP the modification includes adding a signal with two components, namely $W^{k+1}$ and $D^k$. In scenes where there is a dominant motion, motion compensation in $D^k$ translates to a spatial shift. Under assumption (3), we can say that $W^{k+1}$ and $D^k$ are uncorrelated, even if $W^k = W^{k+1}$. As a result, the variance of the sum is expected to be larger than the variance of $W^{k+1}$. Under assumption (5), this translates to a higher increase in bit-rate. Note that, if $W^k = W^{k+1}$ and there is no motion, i.e. $D^k = W^k$, then the additive modification to the signal is zero. Therefore, there is no need for additional bits.

Method Overview

Above, we established the relation between the bit-rate increase due to watermarking and the drift compensation. The method explained here provides an improvement in terms of bit-rate and/or watermark detection, when there is a dominant motion in the sequence, e.g., panning.

FIG. 1 is a flow diagram illustrating an overview of method of placing a watermark in a time varying signal. The method estimates motion of the data between a reference frame and a frame of interest (100). This motion estimation may be performed based on pre-computed motion parameters in the data stream (e.g., motion vectors or affine transform parameters from a video stream), or based on motion parameters derived from motion estimation on the frames at the time of watermark embedding. Next, the method computes a representative motion for a particular embedding location, such as the current frame (104). Finally, the method geometrically transforms the digital watermark to be embedded in the current frame. The digital watermark embedder then performs its embedding operation on the frame to embed the watermark signal into the video data of the current frame.

As detailed below, our particular implementation spatially shifts the watermark signal in synchronization with the dominant motion in the sequence. When the watermark signal, or part of it, is constant (Assumption.4), the proposed method minimizes the variance of the additive modification signal, $W^{k+1} - D^k$. As a result, the same watermark detection strength is achieved with minimum increase in the bit-rate of the compressed video. Equivalently, this may translate to better detection for bit-rate constrained applications.

As an additional advantage, the proposed method improves the detection of the watermark in reconstructed B-VOP's, even if those frames (or the error residuals) have not been watermarked. In essence, we prevent possible de-constructive interference from two reference frames on the B-VOP.

Example Implementation

Figure 2:
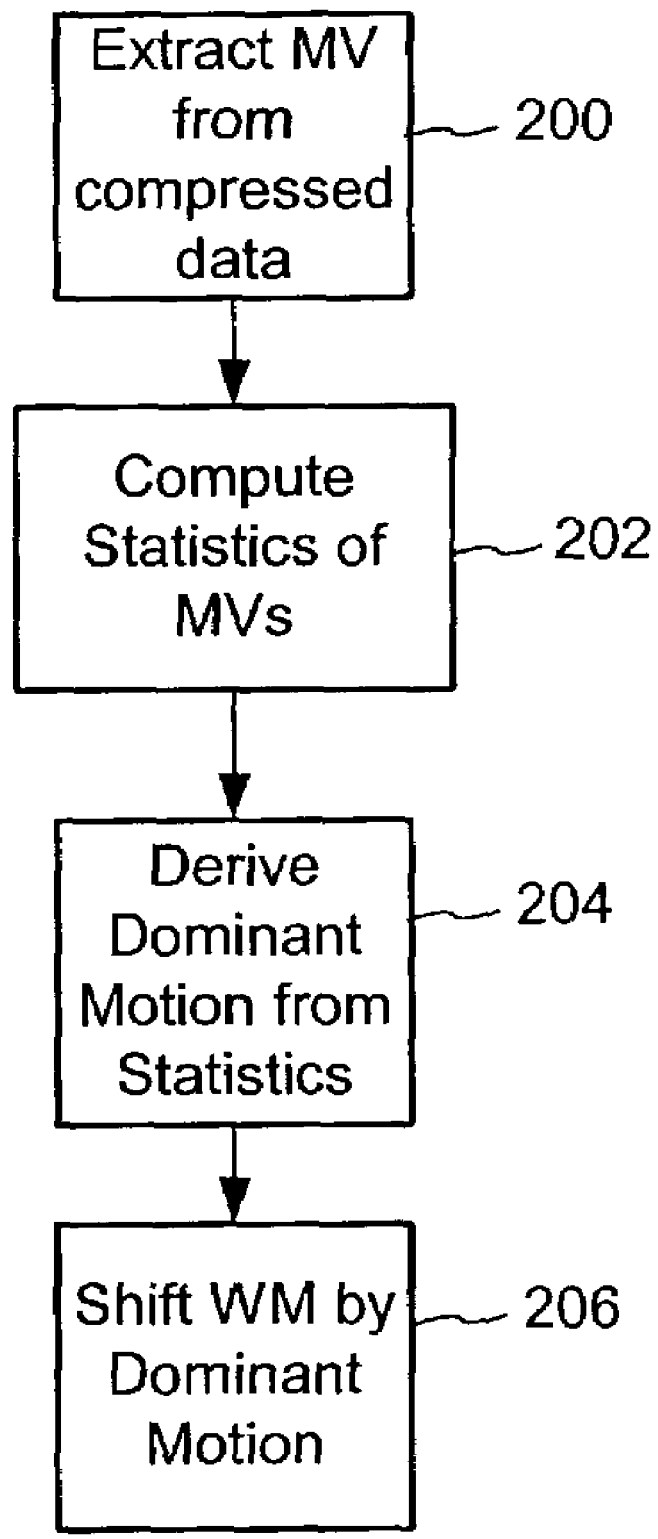
FIG. 2 is a flow diagram of a particular implementation of the method illustrated in FIG. 1.

We would like to determine a global spatial shift value that will coincide with the motion of the most number of blocks of the frame. The compressed domain implementation has a unique advantage at this point. Motion vectors for each block (macro-block) of the frame may be obtained by simply decoding the motion vector VLC's, without employing a costly motion estimation algorithm. Under this observation, pseudo-code of the method is given below. This method is also illustrated in FIG. 2:

1. Decode motion VLC's to obtain motion vectors (MV.x and MV.y) for each block (step 200).
2. Compute the 2-D histogram of motion vectors (step 202)
   a. For all blocks
      i. Hist[MV.x][MV.y]+=1;
3. Find the maxima of the histogram, i.e. the bin with highest count.
4. Define the coordinates of the maxima as the dominant motion (DMV.x, DMV.y) (204).
5. Shift the watermark $W^{k+1}$ by DMV (206).
   a. $W^{k+1}(x,y) = W^{k+1}(x+DMV.x, y+DMV.y)$
6. Execute the rest of the algorithm with updated watermark signal.

Additional Features

The method described above predicts how the watermark in the previous frame will propagate to the current frame. In order to achieve this we have used the motion vectors for the image blocks, and weigh them equally. We implicitly assume that same amount of watermark has been added to all blocks. When and if a local scaling is used for the watermark, the method may be implemented so as to weigh different image blocks with respect to the watermark energy they carry.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

I claim:

1. A method of placing a watermark in a video stream comprising:
   estimating motion between frames in the video stream;
   computing a representative motion for at least part of a frame to be embedded with a digital watermark; and
   spatially adjusting the digital watermark by the representative motion; wherein the representative motion is derived from motion of blocks in a frame, and the motion of the blocks used to derive the representative motion is weighted based on the watermark energy to be carried in the blocks such that blocks carrying more watermark signal are weighted more heavily; and wherein said representative motion comprises a dominant motion derived from motion statistics for the frame and spatially adjusting the digital watermark by the dominant motion.

2. The method of claim 1 wherein the motion is derived from motion data in a compressed video stream.

3. The method of claim 2 wherein the motion data comprises motion vectors.

4. The method of claim 1 wherein spatially adjusting the digital watermark comprises shifting the digital watermark in a direction specified by the representative motion.

5. The method of claim 1 wherein the representative motion comprises a dominant motion in the frame.

6. The method of claim 1 wherein the spatially adjusted watermark is embedded into the video such that the watermark is robust to the spatial adjustment.

7. A computer readable medium having instructions stored thereon for performing the method of claim 1.

8. A method of placing a watermark in a compressed data stream comprised of frames of time varying data, where the data stream includes frames compressed using motion estimation, the method comprising:
   computing a representative motion for a frame based on motion data in the compressed data stream; and
   spatially adjusting a digital watermark to be embedded in the frame by the representative motion of the frame; wherein the representative motion is derived from motion of blocks in a frame, and the motion of the blocks used to derive the representative motion is weighted based on the watermark energy to be carried in the blocks such that blocks carrying more watermark signal are weighted more heavily; and wherein said representative motion comprises a dominant motion derived from motion statistics for the frame and spatially adjusting the digital watermark by the dominant motion.

9. The method of claim 8 wherein the motion data comprises motion vectors.

10. The method of claim 8 wherein spatially adjusting comprises shifting the digital watermark.

11. The method of claim 8 wherein the spatially adjusted watermark is embedded into video frames so that the watermark is robust to spatial adjustment and is detectable in frames of the video despite spatial adjustment of the video.

12. A storage medium on which is stored instructions for performing the method of claim 8.

13. A method of placing a watermark in a compressed video data stream comprised of frames of time varying data, where the data stream includes frames compressed using motion estimation, the method comprising:
   extracting motion vectors for a frame in the compressed video data stream;
   computing a representative motion for at least one part of the frame based on the motion vectors in the compressed data stream; and
   spatially adjusting a digital watermark by the representative motion before embedding the adjusted watermark in the part of the frame; wherein the motion vectors are weighted according to an amount of watermark energy to be embedded in blocks of the video frame corresponding to the motion vectors; and wherein said representative motion comprises a dominant motion derived from motion statistics for the frame and spatially adjusting the digital watermark by the dominant motion.

14. The method of claim 13 wherein the representative motion is derived from a statistical distribution of motion vectors for the frame.

15. A storage medium on which is stored instructions for performing the method of claim 13.

* * * * *

UNITED STATES PATENT AND TRADEMARK OFFICE
CERTIFICATE OF CORRECTION

PATENT NO.        : 7,577,841 B2
APPLICATION NO. : 10/300921
DATED             : August 18, 2009
INVENTOR(S)       : Mehmet U. Celik It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1813 days.

Signed and Sealed this

Fourteenth Day of December, 2010

David J. Kappos
*Director of the United States Patent and Trademark Office*